United States Patent
Thill et al.

(10) Patent No.: US 7,287,353 B2
(45) Date of Patent: Oct. 30, 2007

(54) HEAT SHIELDED DOCK PAD

(75) Inventors: Gregory J. Thill, Dubuque, IA (US); Charles J. Ashelin, Dubuque, IA (US)

(73) Assignee: Rite-Hite Holding Corporation, Milwaukee, WI (US)

(*) Notice: Subject to any disclaimer, the term of this patent is extended or adjusted under 35 U.S.C. 154(b) by 279 days.

(21) Appl. No.: 10/652,322

(22) Filed: Aug. 29, 2003

(65) Prior Publication Data

US 2004/0123532 A1    Jul. 1, 2004

Related U.S. Application Data

(63) Continuation-in-part of application No. 09/548,876, filed on Apr. 13, 2000.

(51) Int. Cl.
  *E04H 14/00* (2006.01)
(52) U.S. Cl. ............. 52/173.2; 52/2.12; 52/309.6; 52/309.9; 52/718.05; 52/DIG. 13; 49/504; 428/308.4; 428/318.6
(58) Field of Classification Search ............. 52/173.2, 52/309.6, 309.9, 2.11–2.13, 173.1, 718.05, 52/309.4, DIG. 13; 428/308.4, 318, 318.6; 49/504, 505, 484.1, 498.1
See application file for complete search history.

(56) References Cited

U.S. PATENT DOCUMENTS

| | | | |
|---|---|---|---|
| 2,187,343 A | 1/1940 | Crockford | |
| 2,320,675 A | 6/1943 | Swift et al. | |
| 3,230,675 A | 1/1966 | Frommelt et al. | |
| 3,286,417 A | 11/1966 | Dazzo | |
| 3,500,599 A | 3/1970 | Sciolino | |
| 3,616,130 A | 10/1971 | Rogosch et al. | |
| 4,158,718 A | 6/1979 | Kehl et al. | |
| 4,167,598 A * | 9/1979 | Logan et al. ............. 428/34.1 |
| 4,299,872 A * | 11/1981 | Miguel et al. ............. 428/117 |
| 4,438,168 A | 3/1984 | Testard | |
| 4,494,341 A | 1/1985 | Schwab | |
| 4,638,612 A | 1/1987 | Bennett | |
| 4,799,341 A | 1/1989 | Frommelt et al. | |
| 4,984,321 A | 1/1991 | Larson | |
| 5,174,084 A | 12/1992 | Alten | |
| 5,185,977 A | 2/1993 | Brockman et al. | |
| 5,268,226 A * | 12/1993 | Sweeney ............. 428/312.4 |
| 5,333,424 A | 8/1994 | Chalfant et al. | |
| 5,442,825 A | 8/1995 | Hahn et al. | |
| 5,524,406 A | 6/1996 | Ragland | |
| 5,675,945 A * | 10/1997 | Giuliani et al. ............. 52/173.2 |
| 5,709,458 A | 1/1998 | Metz | |
| 5,901,428 A | 5/1999 | Sheridan | |
| 5,953,868 A | 9/1999 | Giuliani et al. | |
| 5,996,291 A | 12/1999 | Styba et al. | |
| 6,014,844 A | 1/2000 | Thill | |
| 6,016,637 A | 1/2000 | Styba | |
| 6,170,205 B1 | 1/2001 | Styba | |
| 6,272,799 B1 | 8/2001 | Ashelin et al. | |
| 6,311,435 B1 | 11/2001 | Brockman et al. | |
| 6,444,287 B1 | 9/2002 | Kalb | |

FOREIGN PATENT DOCUMENTS

WO    WO 0179094    10/2001

OTHER PUBLICATIONS

Letter from Mr. James Slattery, dated Aug. 2, 2004.

(Continued)

*Primary Examiner*—Jeanette Chapman
*Assistant Examiner*—Yvonne M. Horton
(74) *Attorney, Agent, or Firm*—Hanley, Flight & Zimmerman, LLC

(57) ABSTRACT

A compressible seal for a loading dock includes a pliable heat shield that helps protect the seal from concentrated heat generated by a truck's taillight being pressed against the seal. The seal includes a compressible foam core protected by a tough outer covering. The heat shield is preferably placed against the foam core, just underneath the cover. The shield reflects heat away from the foam and helps disperse the heat over a broader area to reduce the peak temperature of any hot spots.

11 Claims, 4 Drawing Sheets

OTHER PUBLICATIONS

Series 1000-Fire Resist HP - Drawing allegedly showing a Series 1000 Dock Seal, allegedly dated Dec. 14, 1999.
Email to Mr. James Slattery, dated Apr. 29, 2005.
Letter to Mr. James Slattery, dated Jul. 26, 2006.
Letter from Mr. James Slattery, dated Aug. 22, 2006.
End User Listing Publix - Listing of alleged sales of Dock Seals to Publix, report dated May 5, 2004.
(03012001) Fairborn USA Inc. Loading Dock Seals & Shelters for Truck an - Internet Web site of Fairborn USA, archived Mar. 1, 2001, last updated Jan. 25, 2000, and printed Aug. 24, 2006.
(03062001) Series 1000 Foam Dock Seal With Fixed Head - Internet Web site of Fairborn USA showing Series 1000 Dock Seal as offered for sale by Fairborn USA, archived Mar. 6, 2001, last updated Jan. 25, 2000, and printed Aug. 24, 2006.

* cited by examiner

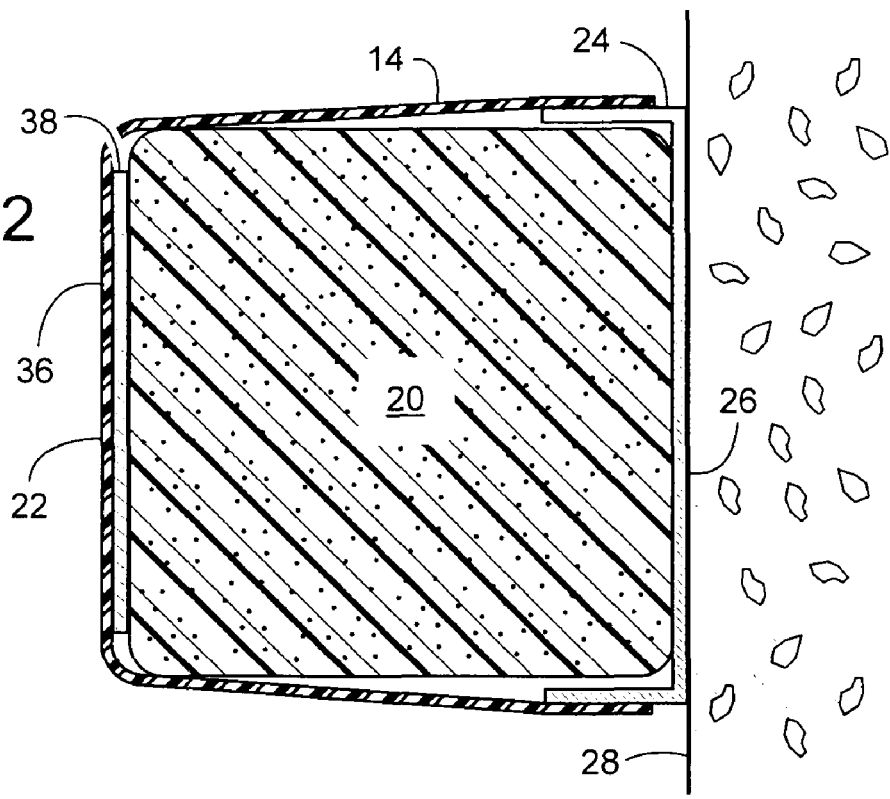
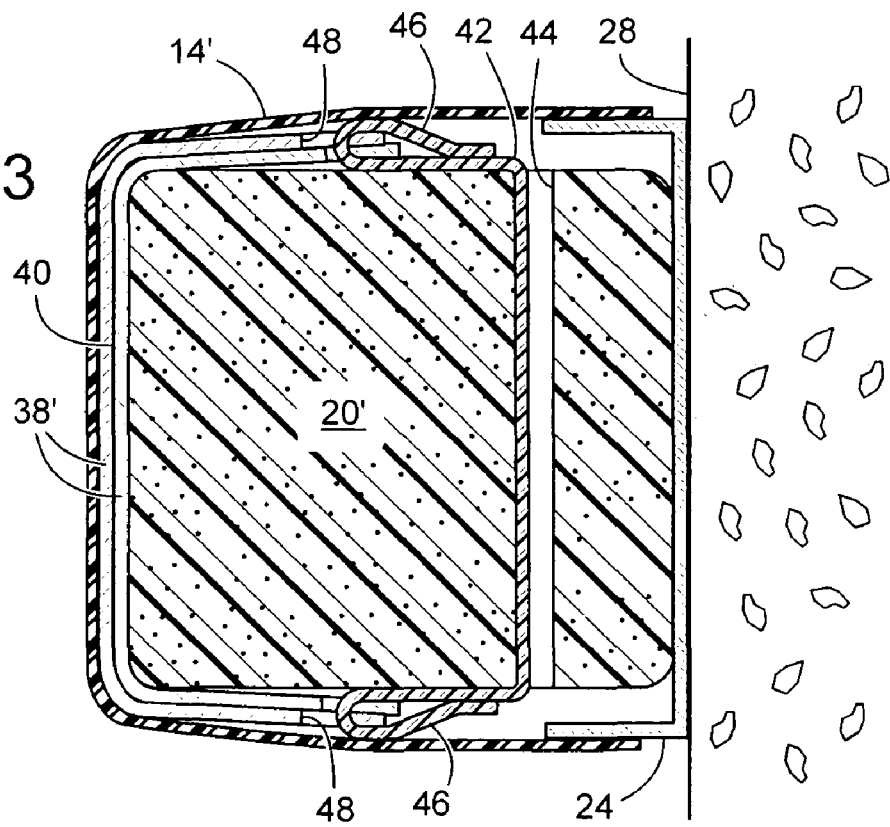

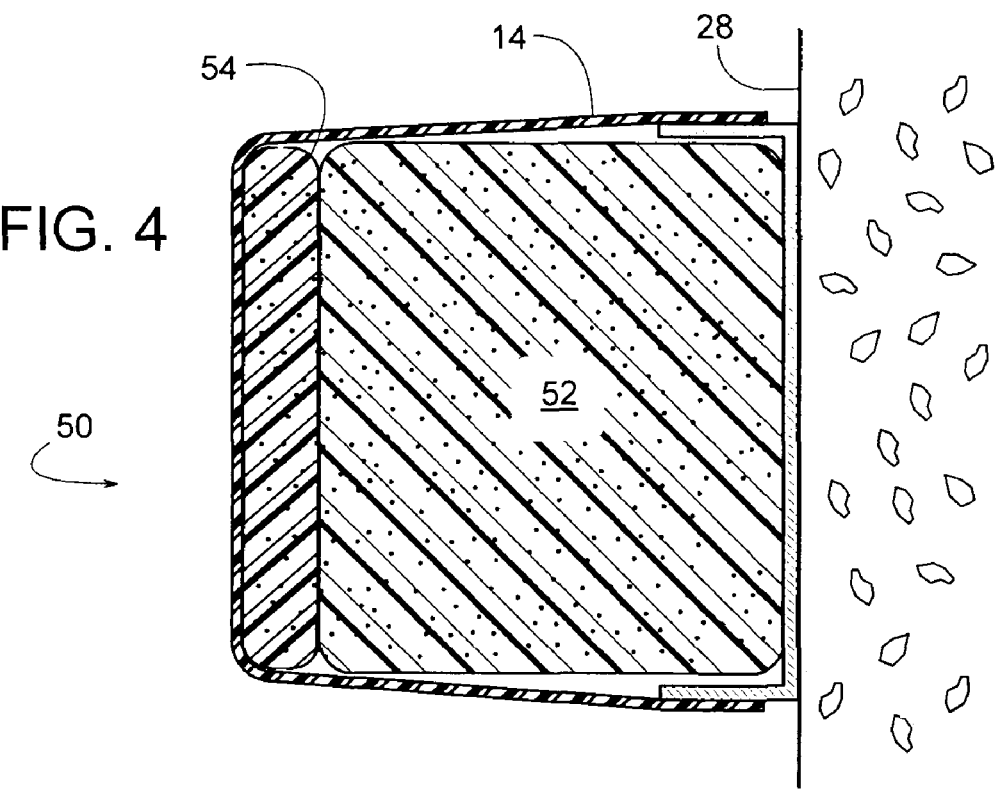
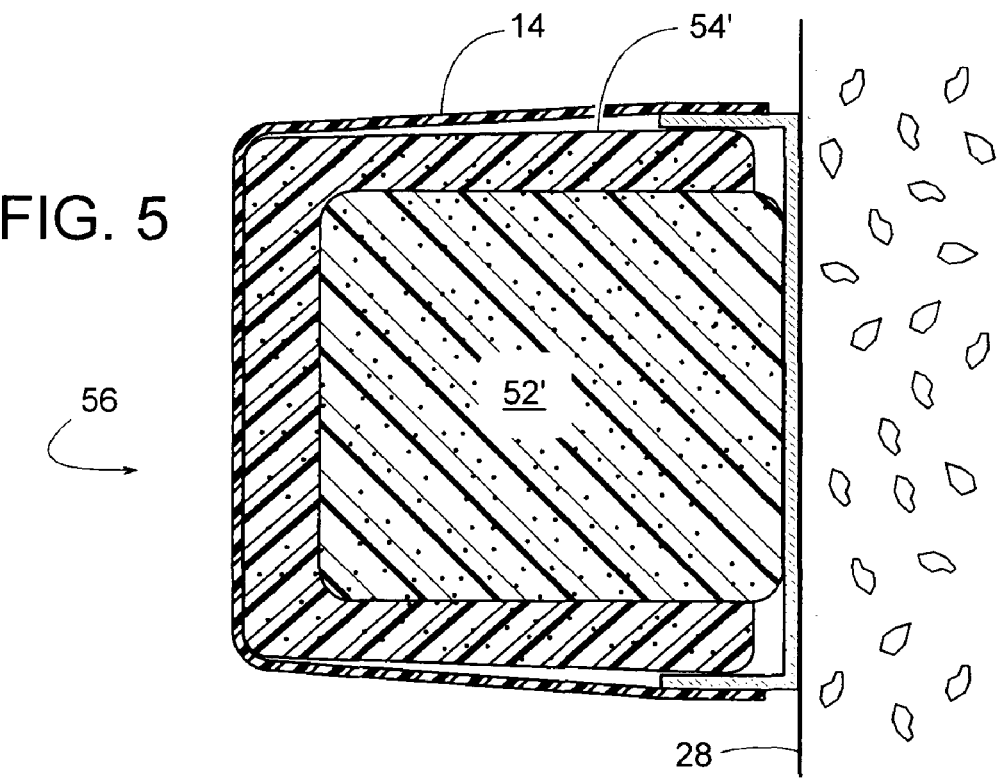

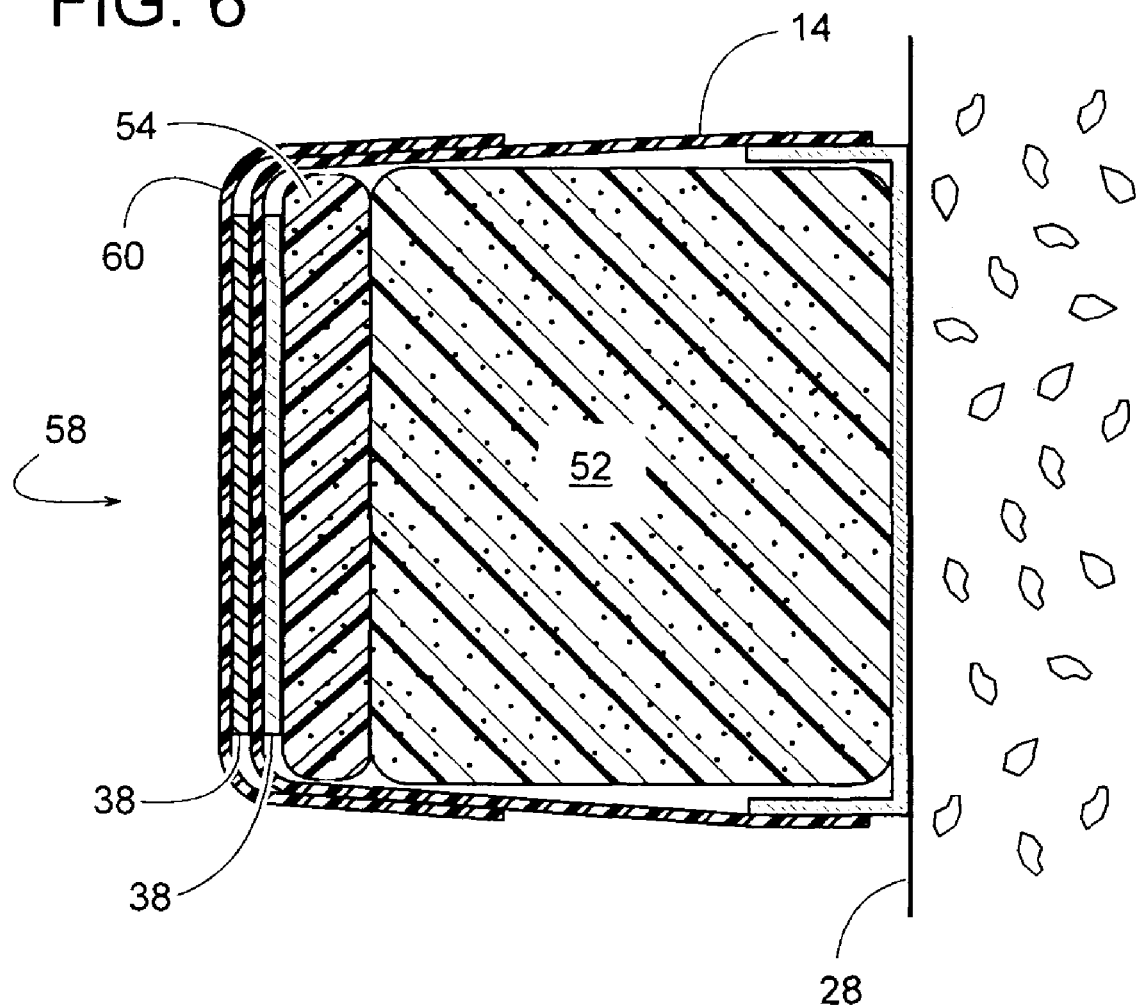

HEAT SHIELDED DOCK PAD

CROSS-REFERENCE TO RELATED APPLICATIONS

This application is a Continuation-in-Part of U.S. patent application Ser. No. 09/548,876, filed Apr. 13, 2000.

BACKGROUND OF THE INVENTION

1. Field of the Invention

The subject invention generally pertains to a loading dock and more specifically to a dock seal disposed around a doorway of the dock.

2. Description of Related Art

When an exterior doorway of a building is used as a loading dock for vehicles, especially trucks, the perimeter of the doorway typically includes a seal known as a dock pad. The dock pad seals off gaps that would otherwise exist between the exterior face of the building and the back end of the truck. This allows cargo from the rear of the truck to be loaded or unloaded while dockworkers and the cargo are protected from the weather. Usually a side dock pad runs vertically along each lateral edge of the doorway, and a top or head pad runs horizontally along the doorway's upper edge. A typical pad comprises a resiliently compressible foam core protected by a fabric outer covering. Sealing is often provided by backing the truck up against the pad, so that the pad compressively conforms to the shape of the rear of the truck.

When a truck backs into a loading dock, in many cases, taillights on the rear of the truck press against the dock pad. This often occurs with taillights that are located along the upper rear edge of the truck, whereby the lights push against the head pad that is mounted over the doorway. Normally, this does not create a problem. However, if the driver of the truck inadvertently leaves the lights on for an extended period (e.g., while the truck is being loaded or unloaded), the dock pad absorbs much of the heat generated by the taillights. The pad's core being made of foam, which is inherently a poor conductor of heat, tends to keep the heat concentrated to a relatively small area of the pad near the light. Thus, the temperature of that area can rise significantly. Excessively high temperatures can degrade the materials of the pad, or in some extreme cases, may even cause portions of the pad to burn or melt.

Perhaps one solution would be to make a dock pad of materials that could tolerate higher temperatures. However, such an approach would likely compromise other desirable qualities of the pad, such as abrasion resistance, puncture resistance, weather resistance, compressibility, resilience, lightweight, appearance, etc., as the materials currently being used are often chosen for the purpose of optimizing these qualities.

SUMMARY OF THE INVENTION

In order to provide a dock seal that can tolerate heat generated by a vehicle's taillight, a dock pad comprising a compressible foam core with a pliable outer cover includes a heat shield that helps protect the foam core and its outer cover from excessive heat.

In some embodiments, a heat shield is interposed between a dock pad's foam core and its cover to retain at least some of advantages of the cover.

In some embodiments, a dock pad is provided with a heat shield that has appreciable thermal conductivity to help disperse heat.

In some embodiments, a dock pad is provided with a heat shield that has appreciable reflectivity to reflect some heat away from a foam core of the dock pad.

In some embodiments, a dock pad is provided with a heat shield that can withstand a higher temperature than a foam core of the dock pad, whereby the heat shield helps protect the foam core from heat.

In some embodiments, a dock pad includes a foam core protected by a fire resistant foam pad.

In some embodiments, a dock pad includes a fire retardant foam core protected by a fire resistant foam pad.

BRIEF DESCRIPTION OF THE DRAWINGS

FIG. 2 is a cross-sectional view taken along line 2—2 of FIG. 1.

FIG. 3 is a cross-sectional view similar to that of FIG. 2, but of another embodiment.

FIG. 4 is a cross-sectional view similar to FIG. 2 but of another embodiment.

FIG. 5 is a cross-sectional view similar to FIG. 2 but of another embodiment.

FIG. 6 is a cross-sectional view similar to FIG. 2 but of another embodiment.

DESCRIPTION OF THE PREFERRED EMBODIMENT

Figure 1:
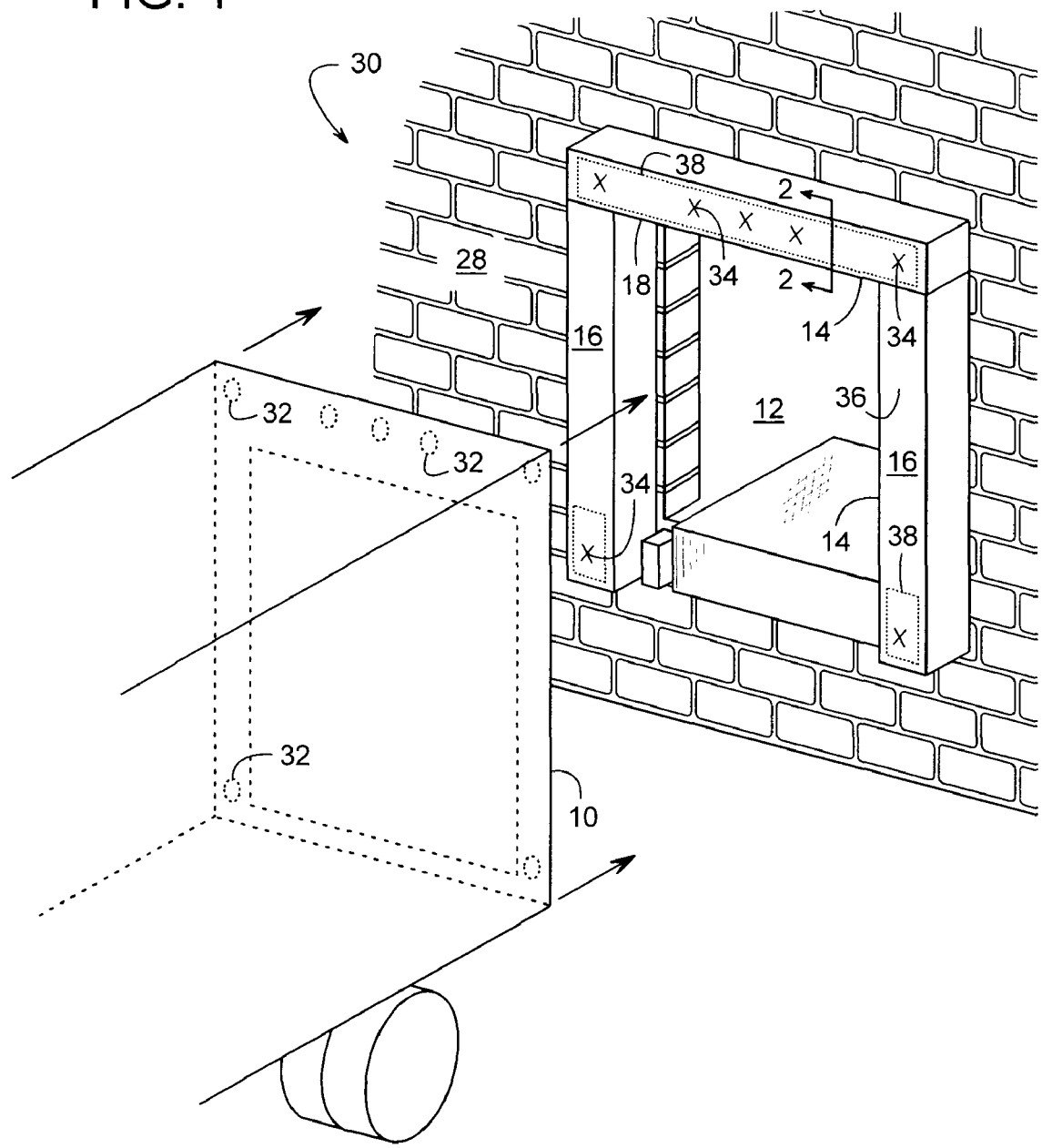
FIG. 1 is a perspective view of a dock pad that includes a heat shield.

To create a weather seal between the rear of a truck 10 (or some other vehicle) and the perimeter a loading dock doorway 12, a dock pad 14 (or dock pad assembly) is installed, as shown in FIG. 1. In this example, dock pad 14 includes a side pad 16 mounted along each lateral edge of doorway 12, and a top or head pad 18 installed along the doorway's upper edge. Pads 16 and 18 are resiliently compressible, so as truck 10 backs up against them, the pads compressively and sealingly conform to the contour of the truck's rear edges.

To provide dock pad 14 with durability and resilient compressibility, pad 14 includes a resiliently compressible foam core 20 covered by a tough outer cover 22, as shown in FIG. 2. In this example, core 20 consists of a polyurethane or foamed polyester, such as, for example, an L24 open-cell polyurethane foam provided by Leggett & Platt of Carthage, Missouri. It should be appreciated by those skilled in the art; however, that a wide variety of other synthetic or natural foams may also work well. In some embodiments, cover 22 is a 3022 MFRLPC DC7 material provided by the Seaman Corporation of Wooster, Ohio. Other examples of cover materials would include, but are not limited to, HYPALON, canvas duck, rubber-impregnated fabric, and coated nylon fabric.

In assembling pad 14, cover 22 wraps at least partially around core 20, and the two are attached to a relatively rigid backer 24, such a formed steel channel or a wood board. Backer 24, in this example, provides a mounting surface 26 that facilitates the installation of pad 14. A conventional fastener or anchor can be used to attach backer 24 to a wall 28 of a loading dock 30. In some embodiments, cover 22 attaches to the side edges of backer 24 by any one of a variety of fasteners including, but not limited to, screws, VELCRO, rivets, hooks, and adhesive. Core 20 can be frictionally held to cover 22, or the two can be joined in a more positive manner. For example, cover 22 can be connected to core 20 with adhesive, straps, hooks, VELCRO, stitches, screws, etc.

To make pad 14 more resistant to heat, such as heat generated by a taillight 32 pressing against certain points 34 on a sealing surface 36 of pad 14, a heat shield 38 is attached to pad 14. In some embodiments, heat shield 38 is incorporated within a Commercial Material RTCM01, which consists of two flexible sheets or layers of perforated aluminum foil reinforced with a polyethylene scrim or fabric, as provided by Radiant Technology, of Dallas, Tex. The flexibility of shield 38 is preferably sufficient to allow dock pad 14 to compressively conform to the contour of the truck's rear edges and then decompress to the pad's original shape. Heat shield 38 can be attached to pad 14 using adhesive, friction, hooks, straps, stitches, and/or various other fasteners. Shield 38 can be attached to the exterior or interior of pad 14; however, shield 38 is preferably installed between cover 22 and foam core 20 for structural, functional, and aesthetic reasons.

Placing shield 38 underneath cover 22, helps keep cover 22 exposed to the outside, thus taking advantage of the cover's toughness, weather resistance and pliability. Moreover, shield 38 preferably has a higher reflectivity than core 20 and cover 22. This can be beneficial in cases where the cover can withstand a higher temperature than the core, wherein "withstand a higher temperature" means a material can be raised to the higher temperature and then substantially recover its original properties after its temperature returns to normal. For example, if the foam of core 20 has an auto ignition point (i.e., temperature at which the material self-ignites without being triggered by a spark or a flame) of 700 degrees Fahrenheit and cover 22 has an auto ignition point of 900 degrees, then heat shield 38 with high reflectivity could reflect heat away from the foam and redirect it into cover 22, which may be able to handle the heat better. In some embodiments, both cover 22 and core 20 have a lower auto ignition point than heat shield 38 (e.g., when shield 38 is one of the two layers of aluminum foil contained within Commercial Material RTCM01).

To reduce peak temperatures of core 20 and/or cover 22 when heated by taillight 32, heat shield 38 is made of a material that has a higher thermal conductivity than core 20 and/or cover 22. The maximum temperature at areas of concentrated heat, such as points 34, is reduced by shield 38 being able to effectively disperse the heat over a broader area. The term, "thermal conductivity" refers to a material's ability to conduct heat of a given temperature gradient along a given length and through a given cross-sectional area of the material, thus thermal conductivity is a property of the material itself, and is generally independent of the material's shape. A typical unit of measure for thermal conductivity would be (Btu)/(hr)(ft)(° F.).

To provide even greater heat protection, another embodiment, similar to that of FIG. 2, provides a dock pad 14' with two heat shields 38', as shown in FIG. 3. It is believed that additional heat protection is provided by the additional overall thickness of the two shields and perhaps partially provided by virtue of an additional slight air interface 40 that may exist between the two shields 38'. Moreover, for a given total thickness, two individual shields instead of one relatively thick one is more flexible, just as a stack of individual cards is more flexible than a stack of cards whose faces are glued together.

A strap 42 inserted through a slit 44 in foam core 20' helps hold the two shields 38' in place. A loop 46 at each end of strap 44 engages holes 48 in shields 38'; however, strap 42 could attach to shields 38' in a variety of other ways as well. Also, strap 42 could feed around the back of core 20' to eliminate the need for slit 44; however, strap 42 extending through slit 44 helps keep strap 42 and shields 38' from shifting along the length of a pad.

In another embodiment, shown in FIG. 4, a dock pad 50 comprises a foam core 52 and a foam pad 54 encased within pliable cover 14. Foam pad 54 is more fire retardant than foam core 52, so pad 54 helps protect core 52 from burning. In some cases, pad 54 is fire resistant (also known as flame resistant) and core 52 is fire retardant (also known as flame retardant).

The meaning of the terms, "fire resistant" and "fire retardant" are based on a standardized vertical burn test known as FAR25.853.A, which is found in the Flammability of Interior Materials section of the U.S. Federal Motor Vehicle Standard #302. Fire retardant generally means that an ignited material will continue burning for only a limited time (post burn time) after an external flame is removed and will self-extinguish before the material is completely consumed by fire. The shorter the post burn time, the more fire retardant is the material. Fire resistant generally means that the material will discontinue burning as soon as the external flame is removed.

Fire resistant foam materials typically consist of a synthetic elastomer, such as chloroprene or neoprene, and are treated to resist burning in the presence of an external flame. Polyurethane is a common material used in fire retardant foams. A variety of fire resistant foams and fire retardant foams are well known to those skilled in the art.

Given that fire resistance and fire retardancy are specific terms of art based on the response of a given material to an external flame, and since the relative fire resistance or retardancy of core 52 and pad 54 are part of what provides the beneficial functionality of the designs of FIGS. 4–6, a term to capture this relative difference will be introduced. Accordingly, as used herein the phrase "fire-preventive" will be used to refer to both the properties of fire resistance and retardancy. Based on this definition, then, the exemplary designs depicted in FIGS. 4–6 can be said to exhibit the feature of the pad 54 being "more fire-preventive" than core 52, which should be interpreted to mean that pad 54 is more flame retardant that core 52, or more flame resistant that core 52, or both more flame retardant and resistant.

Forming a dock pad in this manner has a variety of benefits. For example, the fire-preventive material forming pad 54 may be more expensive than forming core 52. By having a smaller and more fire-preventive volume of pad 54 covering and/or protecting the larger volume core 52, one can obtain the benefit of a fire protected dock pad without the expense of forming the entire unit out of the more fire-preventive material. In addition, the material of pad 54 may have other less desirable properties relative to core 52, as they relate to the functionality of dock pad 50, for example: compressibility, shape memory, wear-resistance, etc. One may be willing, however, to accept these properties in exchange for the higher fire-preventive capabilities of foam 54. At the same time, the effect of these less desirable properties is minimized in the exemplary designs of FIGS. 4–6 by virtue of the fact that the pad 54 forms a (illustratively smaller volume) cover over core 52 that may be formed of a material having more desirable properties relative to the conventional function of dock pad 50. The enhanced fire-preventive properties of pad 54 allow for the trade-offs present in this design to be made.

The more fire-preventative pad 54 can be any thickness and can cover one or more sides of core 52. For a dock pad 56 of FIG. 5, for example, a half-inch thick fire resistant pad 54' extends over three sides of core 52'. Fire resistant pads 54 and 54' may extend the full or partial length of the dock pad.

A dock pad can be provided with additional fire protection by adding one or more layers of heat shield 38. In FIG. 6, for example, a dock pad 58 includes heat shield 38 interposed between pad 54 and cover 14. In some cases, heat shield 38 has a higher thermal conductivity and can withstand a higher temperature than core 52, pad 54, and cover 14. A second, more wear resistant cover 60 can be used to protect cover 14. And a second heat shield 38 can be installed between covers 14 and 60. Various combinations and layers of fire-preventative pad 54, heat shield 38, cover 14, cover 60, and foam core 52 can provide varying degrees of fire protection and wear resistance. The layers can be adhesively bonded to each other or simply held together by the outer cover of the dock pad.

Although the invention is described with reference to a preferred embodiment, it should be appreciated by those skilled in the art that various modifications are well within the scope of the invention. For example, although the illustrated dock pads have cross-sections that are generally rectangular, various other shapes are also well within the scope of the invention. Moreover, the shape of the head pad could be different than that of the two side pads. One or more heat shields can be applied to just the head pad, just the side pads, or applied to both the head and side pads. Therefore, the scope of the invention is to be determined by reference to the claims that follow.

We claim:

1. A dock pad adapted to seal against a vehicle parked against the dock pad, comprising:
    a foam core;
    a foam pad that is more fire-preventative than the foam core;
    a first cover overlaying the foam core and the foam pad, wherein the dock pad is adapted to seal against the vehicle by virtue of the foam core being compressible, the foam pad being compressible, and the first cover being pliable; and
    a heat shield interposed between the first cover and the foam core.

2. The dock pad of claim 1, wherein the more fire-preventative foam pad is between the first cover and the foam core.

3. The dock pad of claim 1, wherein the heat shield has a higher thermal conductivity than the foam core.

4. The dock pad of claim 1, wherein the heat shield has a higher thermal conductivity than the cover.

5. The dock pad of claim 1, wherein the heat shield can withstand a higher temperature than the foam core.

6. The dock pad of claim 1, wherein the heat shield can withstand a higher temperature than the cover.

7. The dock pad of claim 1, wherein the heat shield includes aluminum.

8. The dock pad of claim 1, further comprising a second cover overlaying the first cover, wherein the second cover is more wear resistant than the first cover.

9. A dock pad adapted to seal against a vehicle parked against the dock pad, comprising:
    a foam core;
    a foam pad that is more fire-preventative than the foam core;
    a first cover overlaying the foam core and the foam pad, wherein the dock pad is adapted to seal against the vehicle by virtue of the foam core being compressible, the foam pad being compressible, and the first cover being pliable; and
    a heat shield interposed between the foam pad and the foam core.

10. A dock pad adapted to seal against a vehicle parked against the dock pad, comprising:
    a foam core;
    a foam pad that is more fire-preventative than the foam core;
    a first cover overlaying the foam core and the foam pad, wherein the dock pad is adapted to seal against the vehicle by virtue of the foam core being compressible, the foam pad being compressible, and the first cover being pliable; and
    a heat shield interposed between the first cover and the foam pad.

11. A dock pad adapted to seal against a vehicle parked against the dock pad, comprising:
    a foam core;
    a foam pad that is more fire-preventative than the foam core; and
    a first cover overlaying the foam core and the foam pad, wherein the dock pad is adapted to seal against the vehicle by virtue of the foam core being compressible, the foam pad being compressible, and the first cover being pliable, wherein the foam core has a plurality of sides and the foam pad overlays the plurality of sides.

* * * * *